(12) United States Patent
Jajodia et al.

(10) Patent No.: US 7,720,250 B2
(45) Date of Patent: May 18, 2010

(54) METHOD AND APPARATUS FOR WATERMARKING STREAM DATA

(75) Inventors: Sushil Jajodia, Oakton, VA (US); Huiping Guo, Monterey Park, CA (US); YingJiu Li, Singapore (SG)

(73) Assignee: George Mason University, Fairfax, VA (US)

(*) Notice: Subject to any disclaimer, the term of this patent is extended or adjusted under 35 U.S.C. 154(b) by 962 days.

(21) Appl. No.: 11/419,800

(22) Filed: May 23, 2006

(65) Prior Publication Data

US 2006/0277410 A1 Dec. 7, 2006

Related U.S. Application Data

(60) Provisional application No. 60/683,341, filed on May 23, 2005.

(51) Int. Cl.
*G06K 9/00* (2006.01)
*H04L 9/32* (2006.01)
*H04K 1/00* (2006.01)

(52) U.S. Cl. .................. 382/100; 713/176; 380/255

(58) Field of Classification Search ............ 382/100, 382/232, 240; 380/51, 54, 210, 252, 255, 380/287; 713/176, 179; 370/522–529; 283/72, 283/74–81, 85, 93, 113, 901, 902; 375/130; 725/9, 20, 22
See application file for complete search history.

(56) References Cited

U.S. PATENT DOCUMENTS

| 6,785,815 | B1 * | 8/2004 | Serret-Avila et al. ........ 713/176 |
| 7,020,304 | B2 * | 3/2006 | Alattar et al. ............... 382/100 |
| 7,065,226 | B1 * | 6/2006 | Anzai et al. ................. 382/100 |
| 7,313,248 | B2 * | 12/2007 | Tonisson .................... 382/100 |

\* cited by examiner

*Primary Examiner*—Abolfazl Tabatabai
(74) *Attorney, Agent, or Firm*—David G. Grossman

(57) ABSTRACT

A watermarking system embeds a watermark into data values that may be streamed. A data hash is calculated using data values and a hash key. The data values are grouped. The groups include a first group and a second group. A first group hash is calculated using data values in the first group and a first group hash key. A second group hash is calculated using data values in the second group and a second group hash key. A watermark is constructed based on the first group hash and the second group hash. The value of at least one of the data values in the first group is modified using the watermark.

20 Claims, 17 Drawing Sheets

Algorithm 1 Watermark embedding

1: clear buff(0), buff(1)
2: $j_0 \leftarrow 0$
3: fillBuff(buff($j_0$))            //See algorithm 2
4: $\mathcal{H}_{j_0}$ = getGoupHash(buff($j_0$));      //See algorithm 3
5: while true do
6:     $j_1 = (j_0 + 1) \mod 2$
7:     fillBuff($buff(j_1)$)
8:     $\mathcal{H}_{j_1}$ = getGoupHash(buff($j_1$), $K$);
9:     WatermarkEmbed(buff($j_0$), $\mathcal{H}_{j_0}, \mathcal{H}_{j_1}$) //See algorithm 4
10:    Send data in buff($j_0$)
11:    Clear buff($j_0$)
12:    $j_0 \leftarrow j_1$
13: end while

FIG. 5

Algorithm 2 fillBuffer(buff(j))

1: $k \leftarrow 0$
2: while receive an incoming data $s_i$ do
3:     buff$(j)(k++) = s_i$ // buffer $s_i$
4:     if ($s_i$ is a synchronization point) and ($k \geq L$) then
5:         return
6:     end if
7: end while

FIG. 7

Algorithm 3 getGoupHash(buff($j$),$K$)

1: $k \leftarrow$ number of data in buff($j$)
2: for each data $s_i$ in buff($j$) do
3:    $h_i = \mathcal{HASH}(K, s_i)$       //the last bit of $s_i$ is ignored
4: end for
5: $\mathcal{H} = \mathcal{HASH}(K, h_1, h_2, \cdots, h_k)$
6: return $\mathcal{H}$

FIG. 9

Algorithm 4 watermarkEmbed(buff($j_0$), $\mathcal{H}_{j_0}, \mathcal{H}_{j_1}$)

1: $\mathcal{WH} = \mathcal{HASH}(K, \mathcal{H}_{j_0}, \mathcal{H}_{j_1})$
2: $k \leftarrow$ number of data in buff($j_0$)
3: $W = $ extractBits($\mathcal{WH}, k$)   //See algorithm 5
4: for $i = 1$ to $k$ do
5:    last bit of buff($j_0$)($i$) $\leftarrow w(i)$
6: end for

FIG. 11

Algorithm 5 extractBits($\mathcal{WH}, k$)

1: if length($\mathcal{WH}$) $\geq$ k then
2:     W = concatenation of first k selected bits from $\mathcal{WH}$
3: else
4:     m = k - length($\mathcal{WH}$)
5:     W = concatenation of $\mathcal{WH}$ and extractBits($\mathcal{WH}$,m)
6: end if
7: return $W$

FIG. 13

Algorithm 6 Watermark verification

1: clear buff(0), buff(1)
2: $j_0 \leftarrow 0$
3: $pV_0, V_0 \leftarrow false$
4: fillBuff(buff($j_0$))   //See algorithm 2
5: $\mathcal{H}_{j_0}$ = getGoupHash(buff($j_0$),$K$);   //See algorithm 3
6: while true do
7:    $j_1 = (j_0 + 1) \bmod 2$
8:    fillBuff(buff($j_1$))
9:    $\mathcal{H}_{j_1}$ = getGoupHash(buff($j_1$),$K$);
10:   WatermarkVerify(buff($j_0$), $\mathcal{H}_{j_0}$, $\mathcal{H}_{j_1}$, $pV_0$, $V_0$) //See algorithm 7
11:   Clear buff($j_0$)
12:   $j_0 \leftarrow j_1$
13:   $pV_0 \leftarrow pV_1$
14:   $V_0 \leftarrow V_1$
15: end while

FIG. 15

Watermark detection rationale

| Predicates | Cases | Previous Group $pV_0$ | $V_0$ | Current Group $pV_1$ | $V_1$ | Note: Other possible cases |
|---|---|---|---|---|---|---|
| Watermark Match ($pV_1 = true$) | 1 | true | true | true | true | |
| | 2 | false | false | true | true | One or more entire groups between previous group and the current group may be missing |
| | 3 | false | true | true | true | One or more entire groups between previous group and the current group are missing |
| Watermark Mismatch ($pV_1 = false$) | 4 | true | true | false | true | |
| | 5 | false | true | false | false | False positive may happen for the current group in case of group missing |
| | 6 | false | false | false | false | False positive may happen for the current group or group missing |

Table 1

Watermark verification result and the watermark detection

| Tampering occurs | Verification result($V$) | Watermark detection | Notes |
|---|---|---|---|
| Yes | False | Succeeds | Successfully detects the tampering |
| Yes | True | Fails | Fails to detect the tampering(False negative) |
| No | False | Fails | Mistakenly detects tampering in case of no tampering(False positive) |
| No | True | Succeeds | Successfully passes the verification in case of no tampering |

Table 2

FIG. 17

METHOD AND APPARATUS FOR WATERMARKING STREAM DATA

CROSS REFERENCE TO RELATED APPLICATIONS

This application claims the benefit of U.S. Provisional Application No. 60/683,341, filed May 23, 2005, which is hereby incorporated by reference.

BRIEF DESCRIPTION OF THE DRAWINGS

FIG. 5 shows a flow of a watermark decryption program according to one aspect of the illustrative embodiments.

FIG. 7 shows a flow of a data and group hashing routine according to one aspect of the illustrative embodiments.

FIG. 9 shows a flow of a watermark adjusting routine according to one aspect of the illustrative embodiments.

FIG. 11 shows a system of watermark embedding according to one aspect of the illustrative embodiments.

FIG. 13 shows a watermark embedding algorithm according to one aspect of the illustrative embodiments.

FIG. 15 shows a group hashing algorithm, a watermark embedding algorithm, and a bit extraction algorithm according to one aspect of the illustrative embodiments.

FIG. 17 shows sample test data for false positives according to one aspect of the illustrative embodiments.

DETAILED DESCRIPTION OF EMBODIMENTS

The illustrative embodiments described below relate to the watermarking of data streams to detect anomalies and/or tampering.

Figure 1:
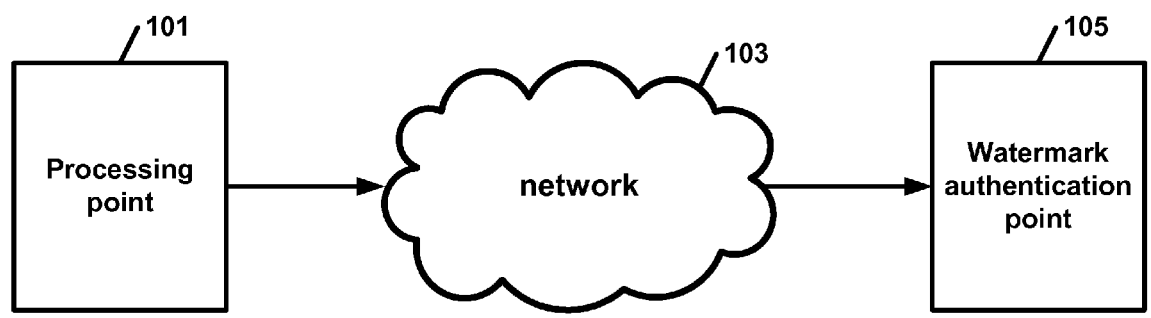
FIG. 1 shows a watermarking system according to one aspect of the illustrative embodiments.

FIG. 1 shows a further system of one aspect of the illustrative embodiments. A data stream can be watermarked at a processing point 101. The data stream can then be sent out over a network, the Internet, or other transmission means 103. The watermarked data stream can then be received and authenticated at a watermark authentication point 105.

Figure 2:
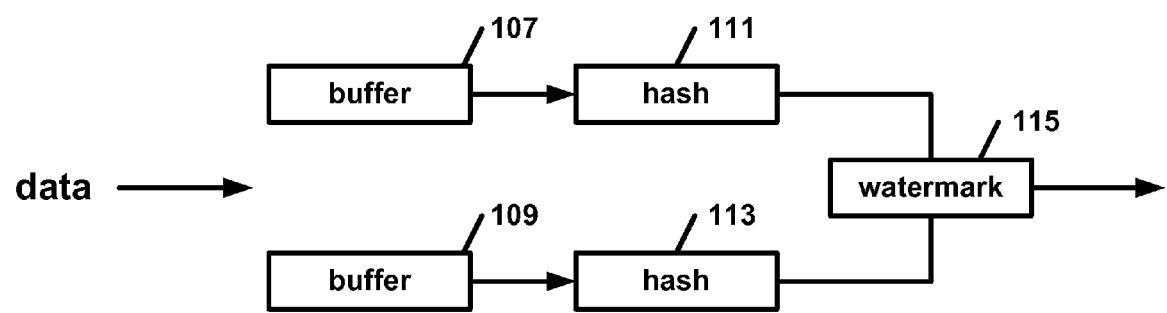
FIG. 2 shows a system for buffering, hashing and watermarking data according to one aspect of the illustrative embodiments.

FIG. 2 shows a system of one aspect of the illustrative embodiments. Data coming in from a data stream can be processed by the sender of the watermarked data. Buffers 107, 109 can be used to buffer incoming data until groups of appropriate sizes are reached. Once buffers 107, 109 are full, the system can produces hashes 111, 113 for the respective buffers. The system may then use those hashed values to produce a watermark 115. In this aspect, the scheme can be group based, and both the sender and the receiver can have two small buffers which are used to store two groups of data. Further, according to this aspect, the data elements can be received in the order that they are sent. Each data element in the stream can be treated independently in this scheme.

Figure 3:
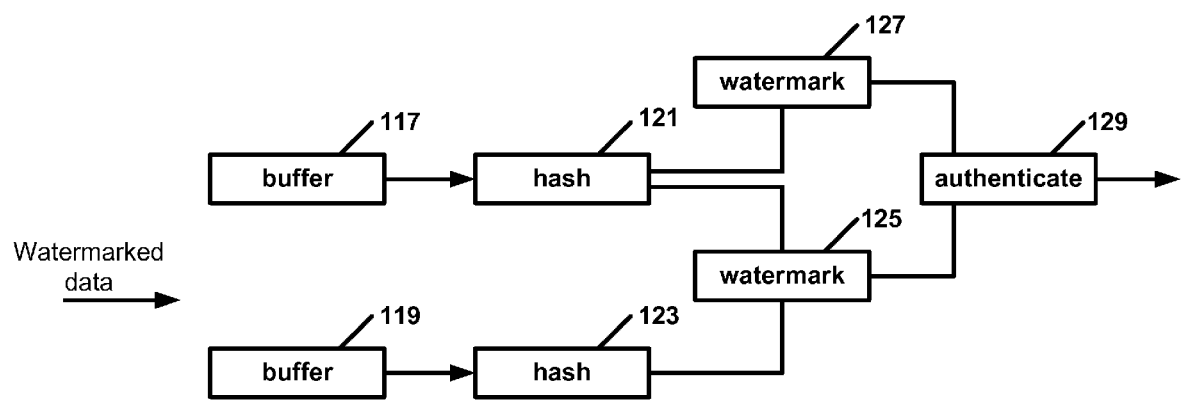
FIG. 3 shows a further system for buffering, hashing and watermarking data according to one aspect of the illustrative embodiments.

FIG. 3 shows a system of one aspect of the illustrative embodiments. Watermarked incoming data can be processed by the receiver of the watermarked data. Buffers 117, 119 can be used to buffer incoming data until groups of appropriate sizes are reached. Once buffers 117, 119 are full, the system can produces hashes 121, 123 for the respective buffers. The system may then use those hashed values to produce a watermark 125 for comparison purposes. The system may also extract an embedded watermark 127 from one of the groups of data 121. Then, to verify the authenticity of the data, the system may authenticate the data at 129 by comparing the extracted watermark 127 with the created watermark 125. In this aspect, the scheme may be group based, and both the sender and the receiver can have two buffers for storing groups of data. Further, according to this aspect, the data elements may be received in the order that they are sent. Each data element in the stream may be treated independently in this scheme.

Figure 4:
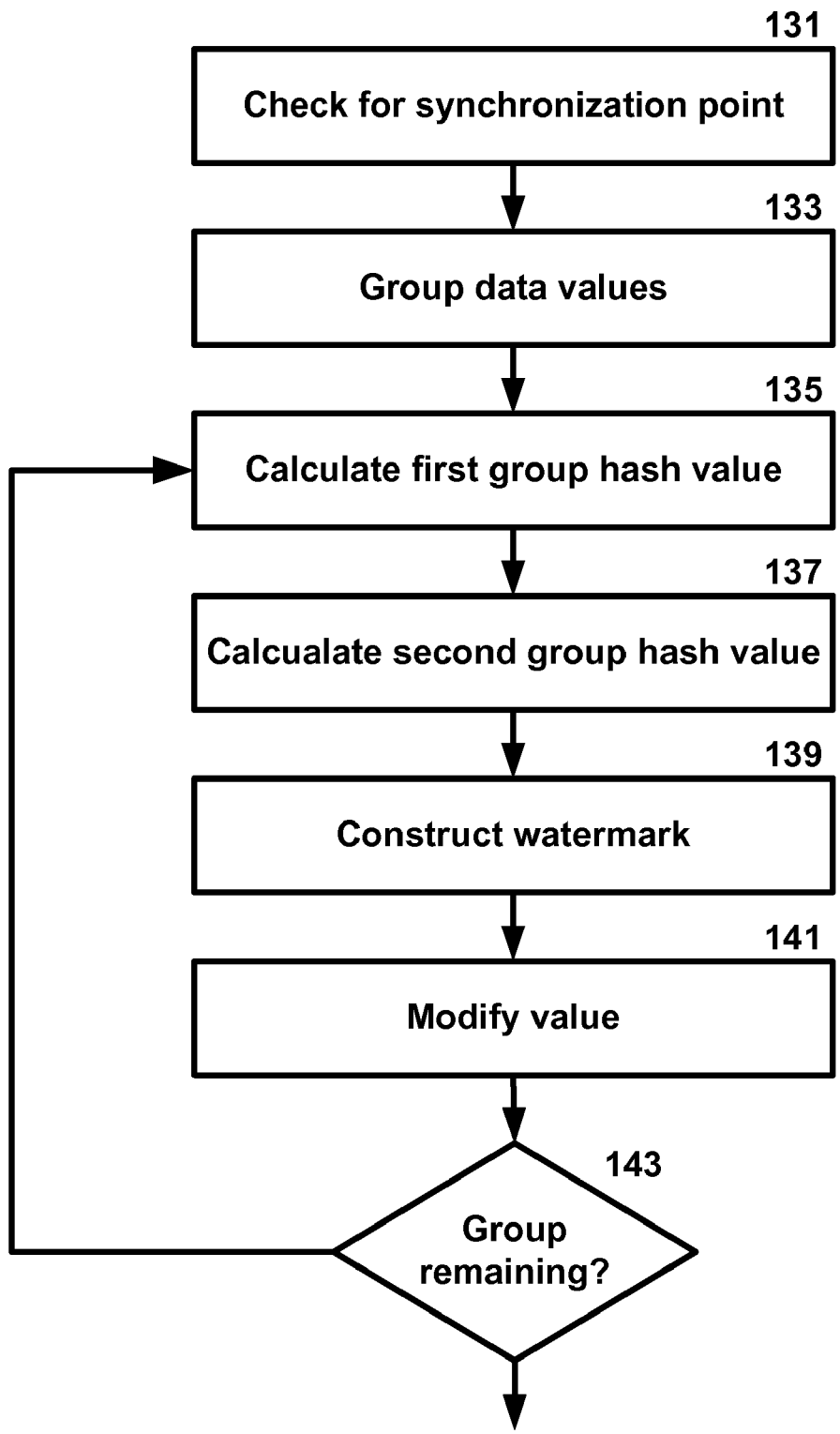
FIG. 4 shows a flow of a watermark encryption program according to one aspect of the illustrative embodiments.

According to one aspect of the illustrative embodiments, a data stream which consists of numerical data elements that can tolerate small distortions introduced by watermark embedding may be processed. FIG. 4 shows flow of one example of a watermark embedding scheme.

For simplicity, a data stream S is a sequence of data elements denoted as $\{s_1, s_2, \ldots, s_t\}$, where $s_i$ is an item which is generated by a data source. Depending on applications, each data element could be a numerical or categorical value, a high-dimensional vector or tuple, a multiple-dimensional array, a data file, or other suitable data element. HASH is a cryptographic hash function such as MD5 or SHA, which takes a message of arbitrary length and secret key K, and produces an output of fixed length. For each item $s_i$, $h_i$ is its corresponding keyed hash value. A number of data elements are grouped together, where $H_{j0}$ denotes the keyed group hash value of the current group and $H_{j1}$ is the group hash of the next group. The number of data elements in a group is denoted as k, which may vary for different groups. The group size may be lower-bounded by L and upper bounded by m. The secure parameters m and L govern how the data elements are grouped. W is a watermark that is embedded in a group. The preliminary watermark verification results of the previous group and current group may be denoted as $pV_0$ and $pV_1$, while the final results are denoted as $V_0$ and $V_1$, respectively.

A watermark embedding algorithm corresponding to one aspect of the illustrative embodiments is shown in algorithm 1 of FIG. 5 corresponding to FIG. 4. It mainly consists of two parts: grouping and embedding. First, a data element may be checked at 131 to see if it is a synchronization point. A data element $s_i$ is a synchronization point if $h_i \bmod m=0$. Throughout the algorithm, according to this aspect, the program may ignore the last bit of each data element when computing its secure hash value, since the last bit will be replaced with a watermark bit. The program may group the data elements at 133 if a synchronization point has not yet been reached. If the synchronization point has been found at 131, the data element may still be grouped at 133, and then the program may proceed to calculate a group hash at 135.

Because whether a data is a synchronization point or not may be governed by K and m. According to this aspect, it may be difficult for one to figure it out without the two secret keys. Of course more than two keys may be used. The program may proceed to the embedding process at 135, 137, 139, 141 if $s_i$ is a synchronization point and the number of elements is larger than L, the lower-bound of the group size; otherwise, the data may be buffered. The group size may be lower bounded for security reasons. The group size greatly affects the security of the scheme. L may be set to prevent small groups.

As shown in FIG. 4, a group hash value may first be computed at 135 as the hash of the concatenation of all individual hash values of data elements in the group. A second hash value may be calculated at 137 based on a second group as well. Then a watermark may be constructed at 139 based on both the current group hash value and the group hash value of the next group. The length of the watermark may be the same as the number of data in the group. The watermark may be embedded at 141 by replacing the least significant bits of all data elements with the watermark bits. In this way, the embedded watermarks can actually be chained so that even if the whole group is deleted, the deletion is still detectable. After the completion of the watermark embedding, the program may check at 143 to see if any groups are remaining. For a finite data stream, an ending vector may be agreed on in advance to indicate the end of a data stream. In this case, to make sure the last group is long enough, the program may need to pad the last group with the ending vector or some other data.

Figure 6:
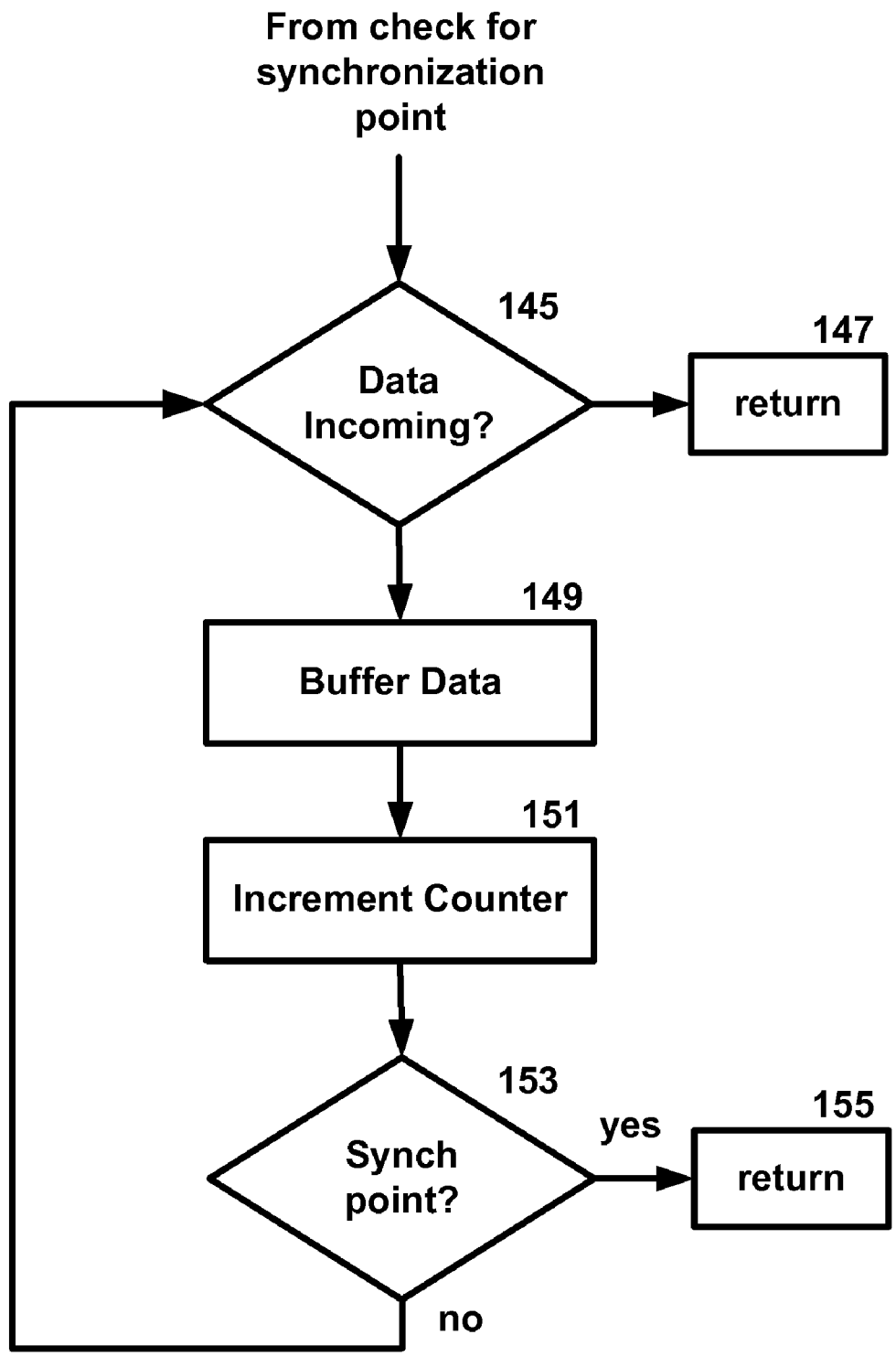
FIG. 6 shows a flow of a data grouping and synchronization point detection routine according to one aspect of the illustrative embodiments.

According to this aspect, the watermark embedder can employ two buffers as shown in FIG. 2: buff($j_0$) 107 may be used for the current group, while buff($j_1$) 109 may be used for the next group. All data between two synchronization points (if the group size is larger than L), including the last synchronization point, can form a group. The watermark embedding may be group based. FIG. 6 shows a flow of a data grouping and synchronization point detection routine according to one aspect of the illustrative embodiments. The algorithm 2 corresponding to this flow is shown in FIG. 7.

The program can check at 145 to see if data is incoming. If no more data is incoming, the program can return at 147 to the main program and a group of a smaller size than the standard size can be hashed and watermarked. If data continues to be present, the program can buffer the data at 149 and increment a counter at 151. After buffering each data set, the program can check to see if a synchronization point has been reached at 153. If the point is reached, the program can return at 155 to the main program and hash and watermark the data. Else, the program can continue to check at 145 for additional data to add to the group.

Figure 8:
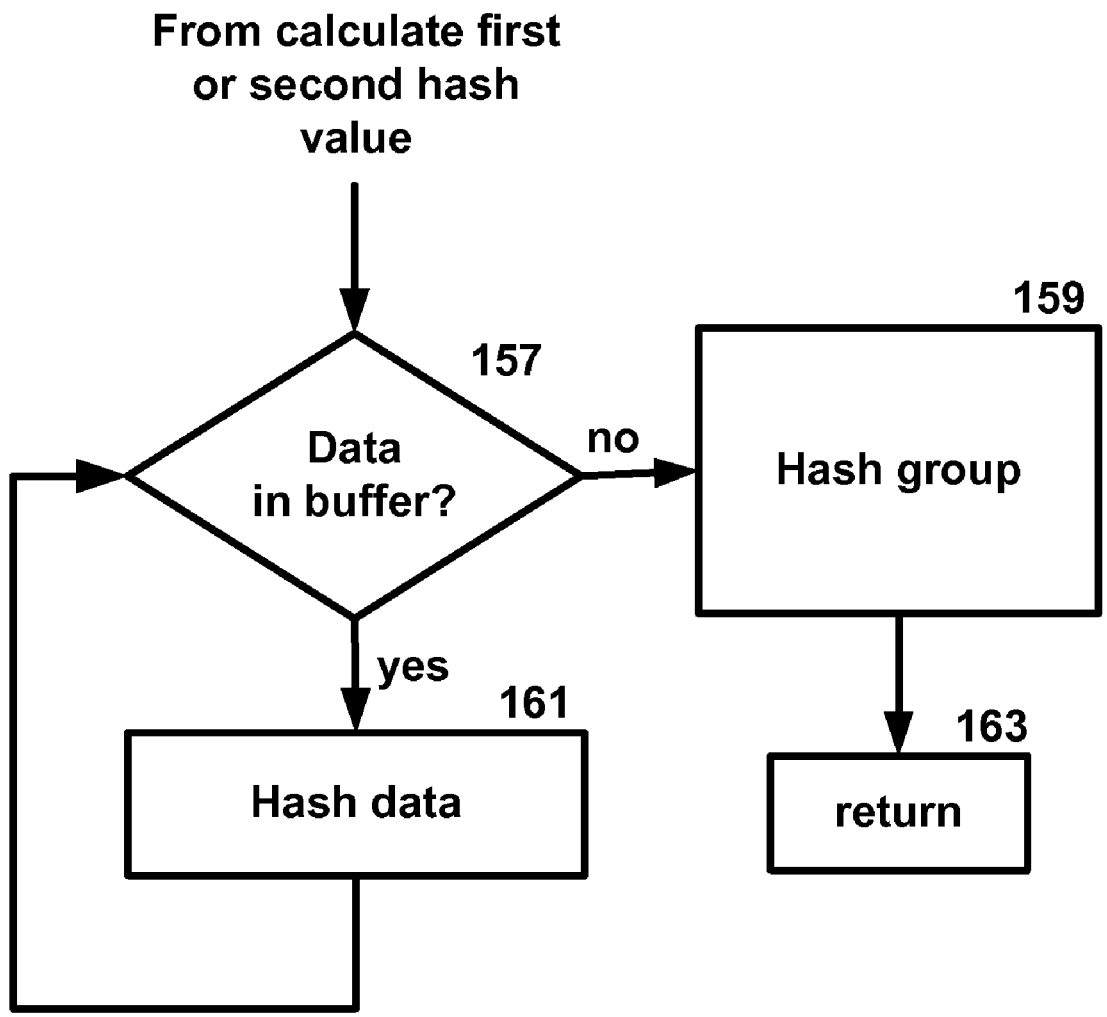
FIG. 8 shows a flow of a watermark embedding routine according to one aspect of the illustrative embodiments.

According to this aspect of the illustrative embodiments, the data in a group may be hashed once the group is full. A flow of this process according to one aspect is shown in FIG. 8. Algorithm 3 corresponding to FIG. 8 is shown in FIG. 9. The program may check at 157 to see if unhashed data remains in the buffer. If unhashed data remains, the program may hash a data element at 161 and then check to see if that was the last element at 157. Once no unhashed data remains, the program may hash at 159 the hashed data values as a whole to obtain a group hash, and may return at 163 the group hash to the main routine.

Figure 10:
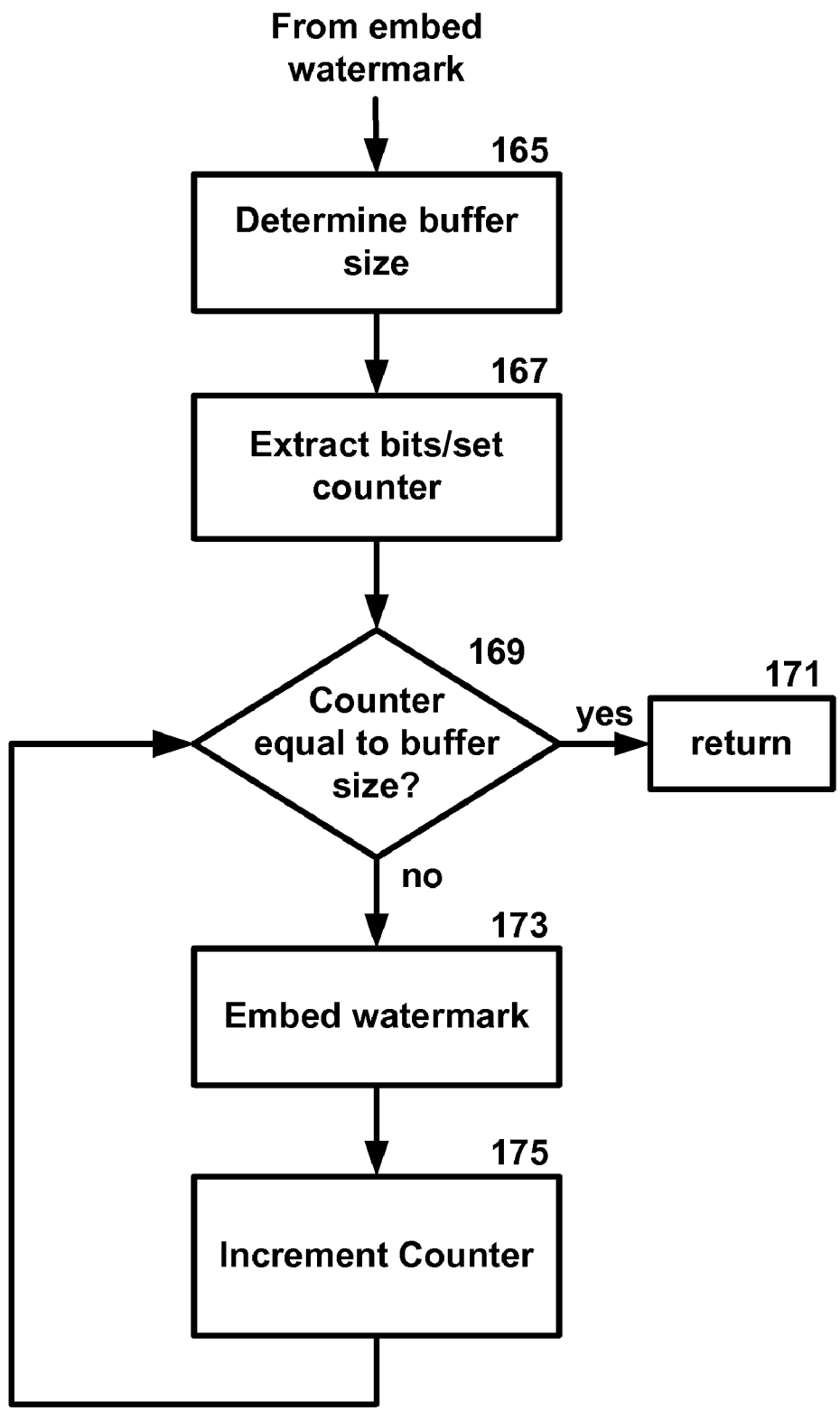
FIG. 10 shows a flow of a watermark extraction and comparison routine according to one aspect of the illustrative embodiments.

According to another aspect of the illustrative embodiments, a flow of which is shown in FIG. 10, a watermark may be embedded in the trailing bit(s) of data elements in a group. The Algorithm 4 corresponding to FIG. 10 is shown in FIG. 11. The program may determine at 165 the size of the group buffer. The program may then extract the appropriate number of bits of the watermark and set a counter at 167. The program can check to see if the counter has reached the buffer size at 169. If the counter has reached the buffer size, the program may return at 171. One bit of the extracted watermark bits can be embedded at 173 in the place of the trailing bits in each datum, and the counter can be incremented. Once the counter reaches the buffer size at 169, then the whole watermark has been embedded and the program can return at 171.

Figure 12:
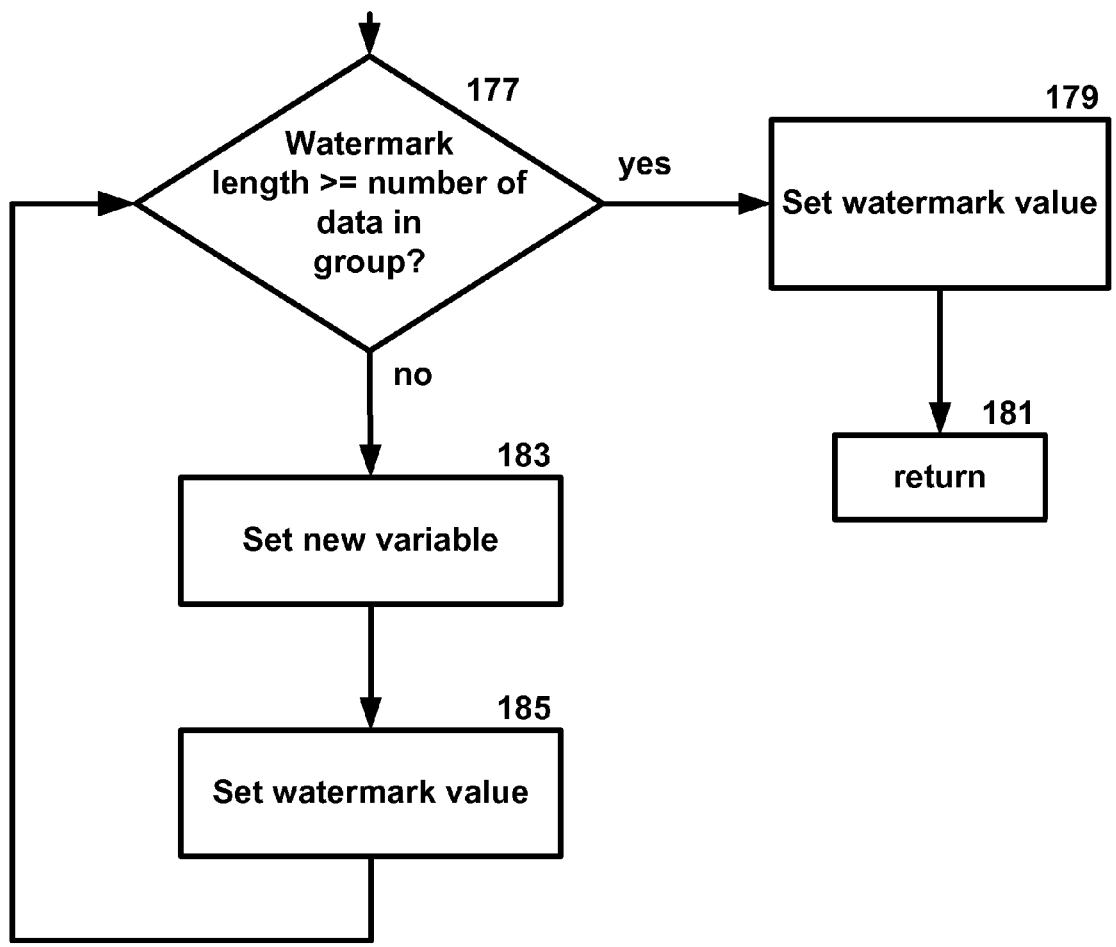
FIG. 12 shows a system of watermark verification according to one aspect of the illustrative embodiments.

FIG. 12 shows a flow of a watermark adjusting routine according to one aspect of the illustrative embodiments, corresponding to Algorithm 5 shown in FIG. 13. The program may first determine at 177 whether or not the watermark size is greater than a size of the extracted bits. If the watermark is less in size than the extracted bit size, then the program may not be able to replace the extracted last bit of each data element with the watermark on a 1-to-1 correspondence. Additional length may need to be added to the watermark to allow replacement of all the bits. If the watermark size is greater than or equal to the size of the extracted bits, then the program may fix the watermark value at 179. In one aspect this may be done by leaving the value fixed if the watermark size is equal to the extracted bit size, and in selecting the first number of bits equal to the size of the extracted bits if the watermark size is greater than the extracted bit size. If the watermark is too small, then the program may set a new variable at 183, determined by subtracting the size of the watermark from the previous size of the number of extracted bits. The new variable may then be used to determine a "filler" for the missing number of watermark bits by recursively calling this the function described by this aspect. The returned value may be concatenated at 185 with the old, too small watermark to obtain a watermark of desired size. Once the program has determined the appropriate watermark, the program may return at 181.

Figure 14:
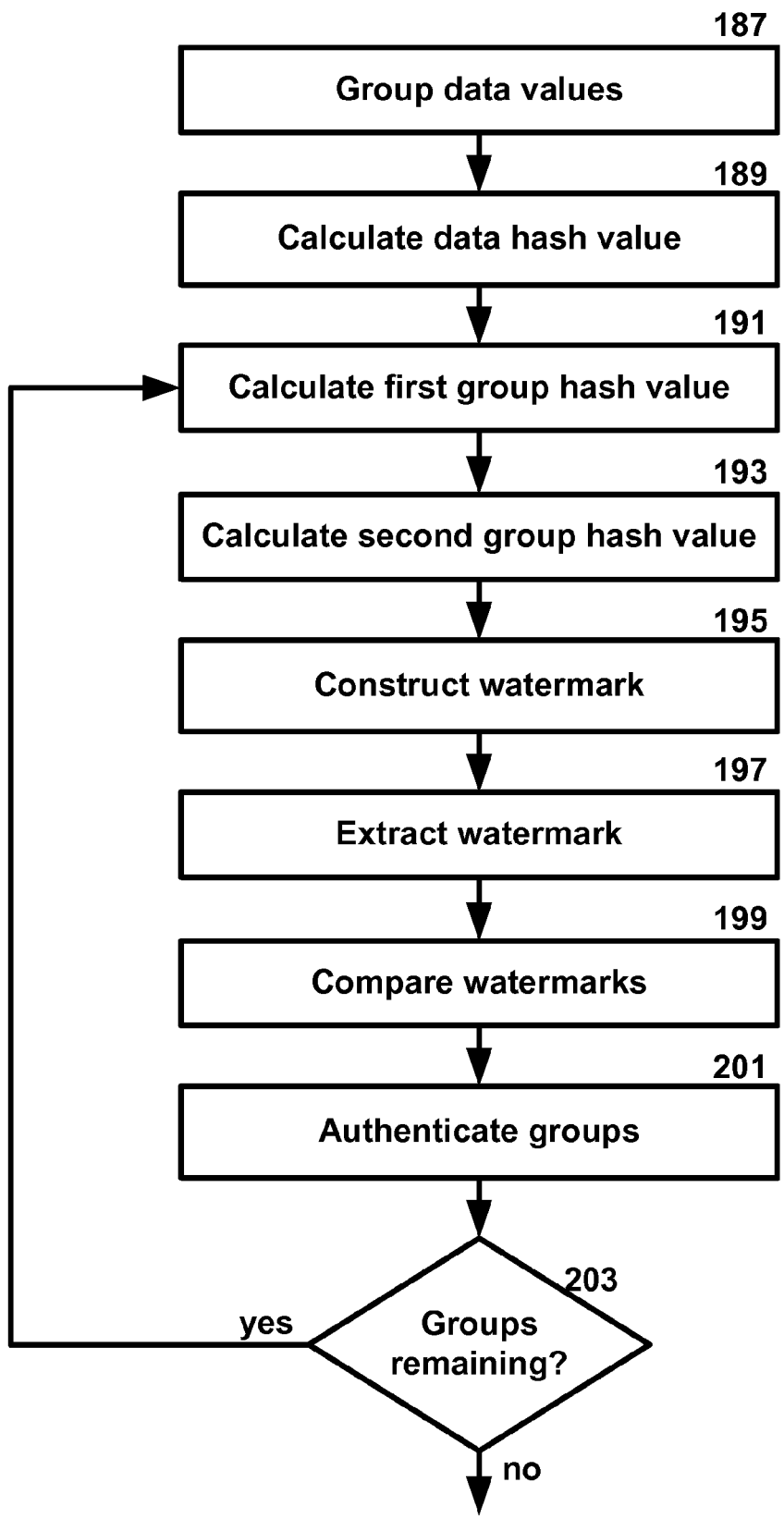
FIG. 14 shows a buffer filling algorithm according to one aspect of the illustrative embodiments.

According to a further aspect of the illustrative embodiments, to verify the integrity of the incoming data stream, two buffers can be used. One flow of a verification program according to one aspect is shown in FIG. 14, corresponding to Algorithm 6 shown in FIG. 15. The program can use the embedding key K, the secret parameter m, and the lower bound L. If a plurality of secret keys is used, then the decoding program may use all of the keys. As in the watermark embedding, a synchronization point may be used to group some data elements into a current group.

The program may group incoming values at 187 until a synchronization point is reached. The program may then calculate at 189 a data hash for each data value in the group. Alternatively, the program may calculate the data hash for each value as it comes in, and then add the value to the group. Other suitable method(s) of grouping and calculation may also be used.

To verify the integrity of the group, the program may wait until a second group is formed. As illustrated, the program calculates at 191, 193 the hash values of a first and a second group. A watermark can be constructed at 195 from the group hash value of the current group and the second group. A watermark may also be extracted at 197 from the grouped data. The constructed watermark can be checked at 199 against the extracted watermark in the current group. If the two watermarks match, both preliminary and final verification are true, the current group can be authenticated at 201 and the watermark detection is successful. The program may then check at 203 to see if additional groups need verification. However, if there is a mismatch, only the preliminary verification ($pV_1$) is false. Since the embedded watermarks can be chained across groups, the program can investigate the integrity of the previous group used for authenticity before ascertaining the final verification result of the current group (backward check). If both the final and the preliminary verification results of the previous group ($pV_0$ and $V_0$) are true, the final verification ($V_1$) is also true, which contradicts the preliminary result $pV_1$. Due to the chaining, the false preliminary result may come from the modifications in either the current group or the next group. If it is from the current group, the preliminary verification of the previous group will definitely be false. Thus, the verification of the previous group $pV_0$=true proves that the second group causes the preliminary verification of the current group to be false and the final verification of the current group ($V_1$) should be set to true. If either the preliminary or verification of the previous group is false, the final verification can be set to be false.

Figure 16:
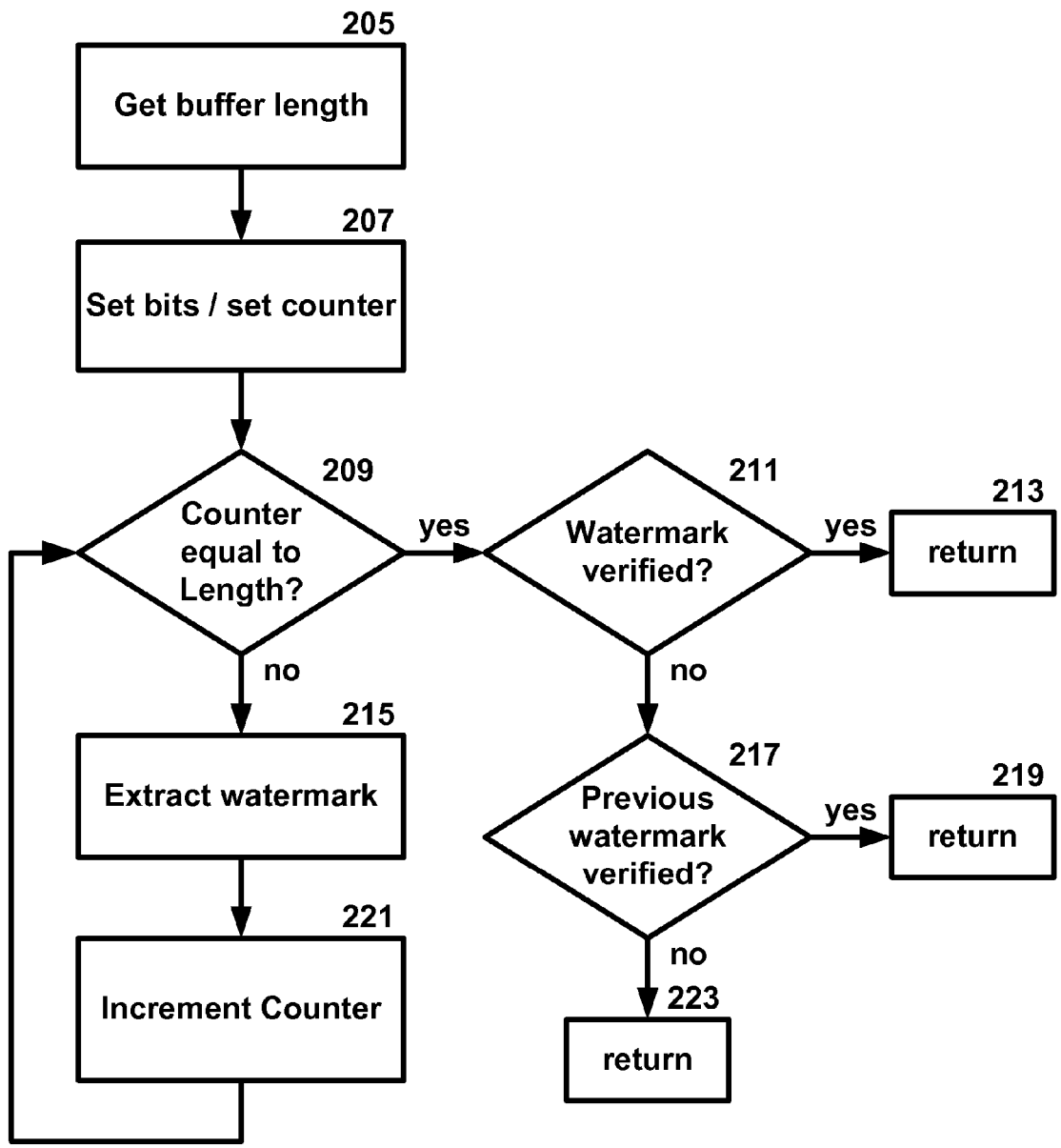
FIG. 16 shows a watermark verification algorithm according to one aspect of the illustrative embodiments.

According to a further aspect of the illustrative embodiments, a flow of which is shown in FIG. 16, a program which has received a stream of data may perform a watermark verification test. The program may determine at 205 the buffer length and set at 209 the appropriate number of bits from a watermark calculated by the receiving program. This process may resemble the watermark size fixing process described in FIG. 12. By adjusting a calculated watermark, the program may ensure that the watermark is the same size as a watermark that is to be extracted from the incoming data. The result of this determination is the watermark that can be used for comparison. The program then can proceed to extract at 215 the trailing bits from the grouped datum, and increment a counter at 221 until the counter is equal at 209 to the group length, indicating that the full watermark has been extracted. The program can then compare at 211 a concatenation of the extracted bits to the comparison watermark and determine if the watermark has been verified. If the watermark is valid, the program can return at 213 a positive. If the watermark is not valid, the program can check at 217 the validity of the previously checked watermark. If the previous watermark was valid, then the error likely lies in the second group of data used to generate the comparison watermark and the program returns at 219 a positive for this group. Else, if the previous group was invalid, then the program can return at 223 an indication that there is an error between this group and the previous group.

A summary of watermark detection is given in tables 1 and 2 shown in FIG. 17.

A false positive occurs when a group is authentic while its final verification result is false. According to this aspect, this may happen if preliminary verification of both the previous group ($pV_0$) and the current group ($pV_1$) are false. In this case, the algorithm asserts false for the final verification of the current group (i.e., $V_1$=false), which may result in a false positive. In one sub-case (case 5 in table 1), the final verification result of the previous group is true. If no groups between the previous group and the current groups are missing, the verification result of the current group is definitely true. However, in case of group missing, it is possible that the current group is indeed authentic while an incorrect assertion is made based on the fake previous group.

In the other sub-case (case 6 in table 1), it is still possible that a wrong decision may be made due to group missing. In case of no group missing, a false positive occurs only when an unmodified group is adjacent to two modified groups.

Though there are possible false positives, they do not always happen. On one hand, since grouping is secure, it is not likely that an attacker happens to delete some entire groups. This greatly reduces possible false positives. On the other hand, if there is more than one unmodified group between two modified groups, there will be few false positives, but this only happens when massive modifications are made. Since the scheme is designed to detect modification, it is more critical to keep the number of false negatives low.

The average length of groups, denoted by $\tilde{m}$, is a parameter that can affect not only the security of the scheme, but also the localization precision in tamper detection (see section 4). For a particular data stream, $\tilde{m}$ is a function of the lower bound L and the parameter m. The program first can compute $\tilde{m}$ for data streams (e.g., stock market data) in which the data elements have random hash values.

Let $x_i = h_i \bmod m$, where $h_i$ is the secure hash of the i-th element in a group. Since all data elements have random hash values, $x_i$ can be considered as a random variable which takes any value from $\{0, \ldots, m-1\}$ with probability $1/m$. The probability that a group has length $k \geq L$ is:

$$\tilde{m} = P[k]$$
$$= P[x_k = 0, x_{k-1} \neq 0, \ldots, x_L \neq 0, x_{L-1} = x, \ldots, x_1 = x]$$
$$= \frac{1}{m} \cdot \left(1 - \frac{1}{m}\right)^{k-L}$$

where x can be any of the values in $\{0, \ldots, m-1\}$. Therefore, the average length of groups is:

$$\tilde{m} = \sum_{k=L}^{\infty} P[k] \cdot k$$
$$= \frac{1}{m} \cdot \left(1 - \frac{1}{m}\right)^{1-L} \sum_{k=L}^{\infty} \left(1 - \frac{1}{m}\right)^{k-1} \cdot k$$
$$= L + m - 1$$

Since the probability that a group has length k (i.e., P[k]) decreases exponentially with k, it is unlikely that some groups grow too long. To verify this, one may choose to use an upper bound U(U>L) for group length in watermark insertion and detection. In such case, the probability that a group has length k is:

$$P[k] = \begin{cases} \dfrac{1}{m} \cdot \left(1 - \dfrac{1}{m}\right)^{k-L} & \text{if } L \leq k \leq U \\ \left(1 - \dfrac{1}{m}\right)^{U-L} & \text{if } k = U \end{cases}$$

Therefore, the average length of groups is:

$$\tilde{m} = U \cdot \left(1 - \frac{1}{m}\right)^{U-L} + \sum_{k=L}^{U-1} P[k] \cdot k$$
$$= U \cdot \left(1 - \frac{1}{m}\right)^{U-L} + \frac{1}{m} \cdot \left(1 - \frac{1}{m}\right)^{1-L} \sum_{k=L}^{U-1} \left(1 - \frac{1}{m}\right)^{k-1} \cdot k$$
$$= L + (m-1) \cdot \left(1 - \left(1 - \frac{1}{m}\right)^{U-L}\right)$$

According to this aspect, the scheme can be designed to detect modifications made to a data stream which consists of a series of numerical data. The watermark can be embedded by introducing small distortions to the data. Since numerical data usually accept small errors, the embedded watermark should not affect the usefulness of the data stream. If a data stream consists of categorical data such as strings and date/time, the scheme is more difficult to apply directly, but the watermark embedding and detection methods can be adjusted to make them applicable to categorical data. For example, if a data stream contains a series of strings, the program can simply embed a watermark bit "1" to a string by inserting a space before it and embed a bit "0" without doing anything. In this way, the watermark is embedded without introducing any distortions to the data (this method can also be applied to numerical data). The receiver can be space sensitive to extract the embedded watermark and verify the integrity of the data stream.

The scheme can also be easily extended to other types of data elements, such as high-dimensional vectors or tuples, multiple-dimensional arrays, or generic data files. The only difference is that a single value (either numerical or categorical) can be chosen from each data element for embedding a watermark bit. Such selection can be determined by the secure hash of the data element. For example, if the data element is a tuple with v non-primary key attributes, one can choose the k-th attribute to embed a watermark bit if k=h mod v, where h is the secure hash of the tuple.

Any modifications made to a data stream can be detected and located. The proposed scheme can be group based and any modifications can be narrowed down to a group. Also, the failure of verification of one group may only affect the watermark verification of up to two other groups and may not propagate to additional groups. An example follows of how to verify the integrity of a group in the average case where a single data element is changed among $\tilde{m}$ elements.

Assume an attacker inserts a fake data element to the stream. This example shows how to detect the modification to defeat the intention of the attacker who wants to make the insertion undetectable. Since synchronization points may play a role in grouping, the program may consider whether the inserted data is a synchronization point.

First, suppose that it is not a synchronization point, and that the insertion occurs in the current group. In this case, the watermark extracted from the group hash will not match the embedded watermark with a high probability, so the verification of the current group will fail. Since the embedded watermarks are chained across groups, though the previous group is authentic, the preliminary verification of that group will still fail. This can be corrected through backward checking. That is, the successful verification of the group before the previous group will make the verification of the previous group succeed.

The probability that the inserted value is not a synchronization point is $1-1/m$. After insertion, the preliminary verification of the current group will succeed (i.e., false negative) with probability $1/2^{m+1}$. Second, if the inserted element is a synchronization point, which will happen with probability $1/m$, it has equal probability $1/(\tilde{m}+1)$ to be inserted into any position. If the synchronization point is inserted into one of the first L-1 positions, then one of the divided groups contains less than L elements; thus, the two groups will be combined into a single group which contains $\tilde{m}+1$ elements due to the lower bound restriction on group size. If the synchronization point is inserted into the other positions, the current group is split into two groups (if the synchronization point is inserted into one of the last L positions, the second divided group will combine with the next group), each of which has at least L elements. Then the probability that either group succeeds in preliminary verification is at most $1/2^{L-1}$. The total false negative in this case is thus:

$$prob \leq \left(1-\frac{1}{m}\right) \cdot \frac{1}{2^{\tilde{m}+1}} + \frac{1}{m}\left(\frac{L-1}{\tilde{m}+1} \cdot \frac{1}{2^{\tilde{m}+1}} + \frac{\tilde{m}-L+2}{\tilde{m}+1} \cdot \frac{1}{2^{L-1}}\right) < \frac{1}{2^{\tilde{m}+1}} + \frac{1}{m} \cdot \frac{1}{2^{L-1}}$$

The modified value has probability $1/m$ to become a synchronization point, and probability $1-1/m$ to be a non-synchronization point. The difference is that if the last element is modified, it may become a synchronization point, which means the group does not change, or non-synchronization point, which means the current group is combined with the next group. In either case, the probability that the group succeeds in preliminary verification is at most $1/2^m$. The total false negative is thus:

$$prob \leq \left(1-\frac{1}{m}\right) \cdot \frac{1}{2^{\tilde{m}}} + \frac{1}{m}\left(\frac{L-1}{\tilde{m}} \cdot \frac{1}{2^{\tilde{m}}} + \frac{\tilde{m}-L+1}{\tilde{m}} \cdot \frac{1}{2^{L-1}}\right) < \frac{1}{2^{\tilde{m}}} + \frac{1}{m} \cdot \frac{1}{2^{L-1}}$$

If one data element is deleted from the current group, it has probability $(\tilde{m}-1)/\tilde{m}$ not to be the last point, and probability $1/\tilde{m}$ to be the last point, which is synchronization point. In the first case, the preliminary verification of the current group will succeed (i.e., false negative) with probability at most $1/2^{\tilde{m}-1}$. In the second case, the false negative is at most $1/2^{\tilde{m}}$ as the current group is merged with the next group. Therefore, the total false negative is:

$$prob \leq \frac{\tilde{m}-1}{\tilde{m}} \cdot \frac{1}{2^{\tilde{m}-1}} + \frac{1}{\tilde{m}} \cdot \frac{1}{2^{\tilde{m}}} < \frac{1}{2^{\tilde{m}-1}} + \frac{1}{\tilde{m}} \cdot \frac{1}{2^{\tilde{m}}}$$

The exact false-negative rate may be difficult to obtain as it can depend on how those changed elements distribute in all affected groups and whether they are synchronization points. Fortunately, the worst case scenario can be easily analyzed. Due to the use of lower bound restriction on group length, no matter how data elements are changed, each modified group (or affected group) can have a length of at least L. With length fixed, the false negative of any affected group remains the same no matter how many elements in the group are changed. Therefore, in the case of an attack at group level, and assuming that g groups are affected in attacks, in the worst case, the preliminary verification of any affected group succeeds (i.e., false negative) is $1/2^L$. The overall false negative, which is the probability that at least one affected group is verified, can be computed by:

$$prob = 1-(1-1/2^L)^g$$

The false negative is monotonic increasing with g. If g is large enough, the false negative will be greater than a tolerable threshold $\tau(\tau>0)$. $\tau$ is the false negative threshold. Let $\hat{g}$ the maximum g such that $prob \leq \tau$; thus, $$\hat{g} \simeq \frac{\log(1-\tau)}{\log(1-1/2^L)}.$$

If the number of affected groups is greater than $\hat{g}$, then the false negative rate is considered intolerable. Given $\tau$, it is easy to know that $\hat{g}$ is monotonic increasing with L.

A special case of deletion is the deletion of a whole group. Since data elements are grouped based on a key, without the key it is difficult for an attacker to determine the data elements that belong to a group. It is not likely that an attacker happens to delete the whole group. However, even if this happens, the scheme can still detect it since the preliminary verification of its previous group can fail with high probability. If the previous group contains $\tilde{m}$ elements, the probability for detecting the deletion of the current group is $1-1/2^{m-1}$, which is higher than probability $1-1/2^L$ for detecting a modified group.

Choosing parameters L and m may also be considered to make trade-offs between security and localization precision in watermark detection. The security is measured by the false negative, the number of affected groups that can be tolerated, and the propagation of affected groups. The localization precision is indicated by the average length of groups.

According to the previous example, the greater the L, the smaller the upper bound of false-negative rate, and the greater the $\hat{g}$, which is the lowest upper bound for the number of affected groups that can be tolerated in watermark detection. This is the bright side of incrementing L. On the other side, the average length $\tilde{m}$ of groups increases linearly with L, thus degrading the localization precision in watermark detection.

Note that m also affects the average length $\tilde{m}$ in a linear manner. Since m does not affect the upper bound of a false negative, it seems that the smaller the m, the better, as the localization precision is higher. A minor negative effect is that given N data elements, the total number of groups $\tilde{g}=N/\tilde{m}$ is larger, thus decreasing the detection rate $\min(\hat{g}, \tilde{g})/\tilde{g}$ (note that the number $\hat{g}$ of affected groups that can be tolerated in watermark detection does not change with m).

If one chooses m=1, then every element is a synchronization point, and each group has fixed length L. In such a case, if an attacker deletes a single data element from the stream, all the groups that follow the group from which the element is deleted are affected. This may produce a large number of false negatives. M may be set to 1, however, if that is the best choice for the application of the scheme.

In the proposed scheme, if pre-verification of the current watermark fails, a backward check can be conducted to see whether the failure is caused by neighboring groups. This may result in false positives. If the data stream can tolerate a few more modifications, say modification of two least significant bits, two watermarks can be embedded in a group. The chained watermark $W_0$ is embedded in the same way as is described in the algorithm. The other watermark $W_1$ is constructed for the current group hash and is embedded to the next significant bits of data in the group. In this way, $W_1$ can be used to verify the integrity of the current group directly, while $W_0$ can be used to detect deletion of entire groups. In this way, false positives can be eliminated.

Another approach to mitigating a replay attack can be to accept a group only if it contains a timestamp that, in the receiver's judgment, is close enough to its knowledge of current time. Like sequence number, the timestamp can be used in watermark computation and can be inserted into the group pseudo-randomly to hide the position of synchronization points. This timestamp approach may require that the clocks between the sender and receiver be synchronized (at least loosely). The inherent difficulty of this approach is that some sort of synchronization may have to be maintained between the clocks of the sender and the receiver. Such synchronization may have to be robust against both network errors and malicious attacks. If there is a temporal loss of synchronization, the opportunity for a successful attack will arise. Due to the variable and unpredictable nature of network delays, precise synchronization may sometimes be difficult to maintain. Therefore, the timestamp approach may have to allow a window of time that is sufficiently large to accommodate network delays yet sufficiently small to minimize the opportunity for a replay attack.

In many applications, the data element itself contains a unique ID (e.g., primary key to database tuple) or time information (e.g., in stock market data and remote sensing data). In such cases, present embodiments may be used directly to thwart a replay attack as one can use the unique ID or timestamp to detect the replay attack.

Embodiments of the invention may be embodied as a series of instructions on a tangible computer readable media. The instructions when executed by one or more processors are configured to perform a method for embedding a watermark into data values that may be streamed. The method may include calculating a data hash based on data values using a hash key. Data values may be grouped the data values into groups, the groups including a first group and a second group. A first group hash may be calculated using data values in the first group and a first group hash key. A second group hash may be calculated using data values in the second group and a second group hash key. A watermark based on the first group hash and the second group hash may be constructed. The value of at least one of the data values in the first group may be modified using the watermark.

Depending upon aspects of the embodiments, the various keys may be the same or different. Similarly, one or all of the keys may be secret.

The modifying may further include modifying the least significant bit of at least one of the data values. An extension of this may include modifying a plurality of least significant bits of at least one of the data values. The grouping may include: buffering a plurality of data values; and grouping the buffered values as a group of a size designated by a size key. The size key may be kept as a secret.

Once the data is grouped, the remaining steps may be repeated until all of the groups have been processed. The repeating may include checking for a final group. Once a final group is detected: that final group may be processed slightly differently from the rest of the groups. The processing may include: calculating a final first group hash for the final group; constructing a final watermark using the final first group hash; and modifying the value of at least one of the data values in the final group using the final watermark.

Additionally, embodiments may include verifying the just described watermark. A method for verifying a watermark may include receiving an incoming stream of data values. The data values may be grouped into groups. The groups should include a first group and a second group. A first group hash may be calculated using data values in the first group and a first group hash key. A second group hash may be calculated using data values in the second group and a second group hash key. A constructed watermark may be generated using the first group hash and the second group hash. An embedded watermark may be extracted from the first group. A comparison may then be made between the extracted watermark and the constructed watermark. The first group may then be authenticated using the results of the comparison.

It may be useful to buffer the received data values and to then group the buffered data values as a group of a size designated by a size key. Like before, several of the steps may be repeated until no more groups remain. A check may be made for a final group. One a final group is detected, a series of steps slightly different from before may be performed including: calculating a final first group hash for the final group; generating a final constructed watermark using the final first group hash; extracting a final embedded watermark from the final group; comparing the final extracted watermark to the final constructed watermark; and authenticating the final group based on the results of the comparison.

Some embodiments of the present invention may be embodied a modules. Modules may be implemented in software or hardware. For example, to provide fast data processing operations, some of the modules could be implemented in FPGA or ASIC type devices. The modules may be logical or discrete. For example, a logical module could include a sub routine that performs a specific function or just a series of instructions embedded in a larger program. In the case of devices such as an FPGA or ASIC, the code utilized by the designer of a device may look very similar to a software module, even though the result includes the customized connection of gates. It is intended that the disclosed embodiments and equivalents thereof will be implemented in new devices that are capable of processing data, even if those devices are not currently known to those skilled in the art today.

A series of modules to practice an embodiment of a data watermarking system may include a data watermark inserter and a data watermark verifier. The data watermark inserter may include: a data hash calculator; a data grouper; a first group hash calculator; a second group hash calculator; a watermark constructor; and a data value modifier. The a data hash calculator may be configured to calculate a data hash based on data values using a hash key. The data grouper may be configured to group the data values into groups, the groups including a first group and a second group. The first group hash calculator may be configured to calculate a first group hash using data values in the first group and a first group hash key. The second group hash calculator may be configured to calculate a second group hash using data values in the second group and a second group hash key. The watermark constructor may be configured to construct a watermark based on the first group hash and the second group hash. The data value modifier may be configured to generate modified data values by modifying the value of at least one of the data values in the first group using the watermark.

The data watermark verifier may include a data receiver; a verification data grouper; a first verification group hash calculator; a second verification group hash calculator; a verification watermark generator; a verification embedded watermark extractor; a verification watermark comparator; and an authenticator. The data receiver may be configured to receive an incoming stream of the modified data values. The verification data grouper may be configured to group the modified data values into verification groups, the groups including a first verification group and a second verification group. The first verification group hash calculator may be configured to calculate a first verification group hash using data values in the first verification group and the first group hash key. The second verification group hash calculator configured to calculate a second verification group hash using data values in the second verification group and the second group hash key. The verification watermark generator may be configured to generate a verification constructed watermark based on the first verification group hash and the second verification group hash. The verification embedded watermark extractor may be configured to extract a verification embedded watermark from the first verification group. The verification watermark comparator may be configured to compare the verification embedded watermark to the verification constructed watermark; and the authenticator may be configured to authenticate the first verification group using results from the verification watermark comparator.

While various aspects of the illustrative embodiments have been described above, it should be understood that they have been presented by way of example, and not limitation. It will be apparent to persons skilled in the relevant art(s) that various changes in form and detail can be made therein without departing from the spirit and scope of the illustrative embodiments. In fact, after reading the above description, it will be apparent to one skilled in the relevant art(s) how to implement the invention in alternative embodiments. Thus, the present invention should not be limited by any of the above described illustrative embodiments. In particular, it should be noted that, for example purposes, the above explanation has included examples of embodiments implemented as software. However, those experienced in the art will realize that multiple other embodiments, including, but not limited to embedded code for processors embedded in hardware; software for running on general purpose computers, and hardware devices such as ASIC and FPGA devices, can be used.

In addition, it should be understood that any figures, screen shots, tables, examples, etc. which highlight the functionality and advantages of the illustrative embodiments, are presented for example purposes only. The architecture of the illustrative embodiments is sufficiently flexible and configurable, such that it may be utilized in ways other than that shown. For example, the steps listed in any flowchart may be re-ordered or only optionally used in some aspects.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

Furthermore, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A tangible computer readable media containing a series of instructions that when executed by one or more processors performs a method of embedding a watermark comprising:
   a) calculating a data hash using data values and a hash key;
   b) grouping the data values into groups, the groups including a first group and a second group;
   c) calculating a first group hash using data values in the first group and a first group hash key;
   d) calculating a second group hash using data values in the second group and a second group hash key;
   e) constructing a watermark using the first group hash and the second group hash; and
   f) modifying the value of at least one of the data values in the first group using the watermark.

2. The method of claim 1, wherein the data values are streamed.

3. The method of claim 1, wherein at least two of the following are the same:
   a) the hash key;
   b) the first group hash key; and
   c) the second group hash key.

4. The method of claim 1, wherein at least one of the following are secret:
   a) the hash key;
   b) the first group hash key; and
   c) the second group hash key.

5. The method of claim 1, wherein the modifying further comprises modifying the least significant bit of at least one of the data values.

6. The method of claim 1, wherein the modifying further comprises modifying a plurality of least significant bits of at least one of the data values.

7. The method of claim 1, wherein the grouping further comprises:
   a) buffering a plurality of data values; and
   b) grouping the buffered values as a group of a size designated by a size key.

8. The method of claim 1, further comprising repeating 1.c through 1.f for as long as groups remain.

9. The method of claim 8, wherein the repeating further comprises:
   a) checking for a final group; and
   b) if a final group is detected:
      i) calculating a final first group hash for the final group;
      ii) constructing a final watermark using the final first group hash; and
      iii) modifying the value of at least one of the data values in the final group using the final watermark.

10. A tangible computer readable media containing a series of instructions that when executed by one or more processors performs a method for verifying a watermark comprising:
   a) receiving an incoming stream of data values;
   b) grouping the data values into groups, the groups including a first group and a second group;
   c) calculating a first group hash using data values in the first group and a first group hash key;
   d) calculating a second group hash using data values in the second group and a second group hash key;
   e) generating a constructed watermark using the first group hash and the second group hash; and
   f) extracting an embedded watermark from the first group;
   g) comparing the extracted watermark to the constructed watermark; and
   h) authenticating the first group using the results of the comparison.

11. The method of claim 10, wherein at least two of the following are the same:
   a) the hash key;
   b) the first group hash key; and
   c) the second group hash key.

12. The method of claim 10, wherein at least one of the following are secret:
   a) the hash key;
   b) the first group hash key; and
   c) the second group hash key.

13. The method of claim 10, wherein the extracting further comprises extracting the least significant bit of at least one of the data values.

14. The method of claim 10, wherein the extracting further comprises extracting a plurality of least significant bits of at least one of the data values.

15. The method of claim 10, wherein the grouping further comprises:
   a) buffering data values; and
   b) grouping the buffered data values as a group of a size designated by a size key.

16. The method of claim 10, further comprising repeating 11.c through 11.h until no more groups remain.

17. The method of claim 16, wherein the repeating further comprises:
   a) checking for a final group; and
   b) if a final group is detected:
      i) calculating a final first group hash for the final group;
      ii) generating a final constructed watermark using the final first group hash;
      iii) extracting a final embedded watermark from the final group;
      iv) comparing the final extracted watermark to the final constructed watermark; and
      v) authenticating the final group using the results of the comparison.

18. A data watermarking system comprising:
   a) a data hash calculator configured to calculate a data hash using data values and a hash key;
   b) a data grouper configured to group the data values into groups, the groups including a first group and a second group;
   c) a first group hash calculator configured to calculate a first group hash using data values in the first group and a first group hash key;
   d) a second group hash calculator configured to calculate a second group hash using data values in the second group and a second group hash key;
   e) a watermark constructor configured to construct a watermark using the first group hash and the second group hash; and
   f) a data value modifier configured to generate modified data values by modifying the value of at least one of the data values in the first group using the watermark.

19. A data watermarking system according to claim 18, further including:
   a) a data receiver for receiving an incoming stream of the modified data values;
   b) a verification data grouper configured to group the modified data values into verification groups, the groups including a first verification group and a second verification group;
   c) a first verification group hash calculator configured to calculate a first verification group hash using data values in the first verification group and the first group hash key;
   d) a second verification group hash calculator configured to calculate a second verification group hash using data values in the second verification group and the second group hash key;
   e) a verification watermark generator configured to generate a verification constructed watermark using the first verification group hash and the second verification group hash; and
   f) an verification embedded watermark extractor configured to extract a verification embedded watermark from the first verification group;
   g) a verification watermark comparator configured to compare the verification embedded watermark to the verification constructed watermark; and
   h) an authenticator configured to authenticate the first verification group using results from the verification watermark comparator.

20. A data watermark verifier comprising:
   a) a data receiver for receiving an incoming stream of data values;
   b) a data grouper configured to group the data values into groups, the groups including a first group and a second group;

c) a first group hash calculator configured to calculate a first group hash using data values in the first group and a first group hash key;
d) a second group hash calculator configured to calculate a second group hash using data values in the second group and a second group hash key;
e) a watermark generator configured to generate a constructed watermark using the first group hash and the second group hash; and
f) an embedded watermark extractor configured to extract an embedded watermark from the first group;
g) a watermark comparator configured to compare the extracted watermark to the constructed watermark; and
h) an authenticator configured to authenticate the first group using results from the watermark comparator.

* * * * *